Jan. 15, 1957 A. J. BRAME 2,777,346
PREDETERMINED TORQUE RELEASE UNIT FOR WRENCHES AND THE LIKE
Filed June 21, 1954
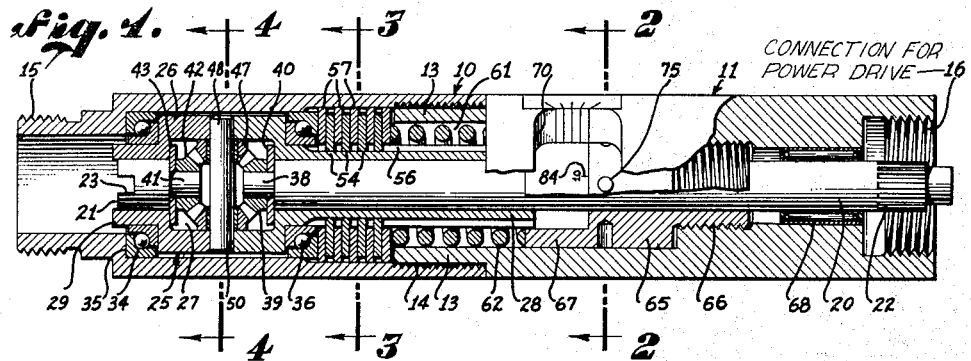
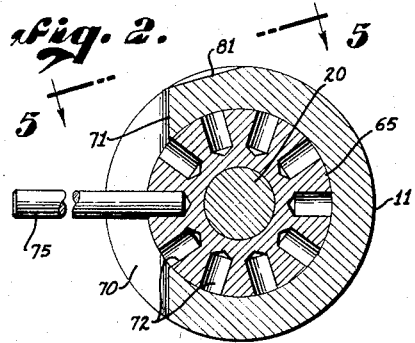
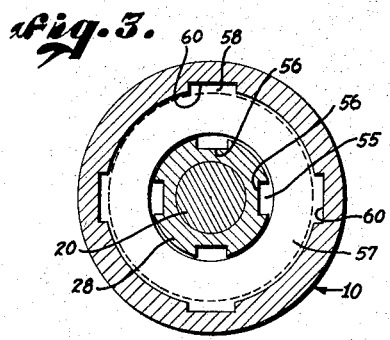
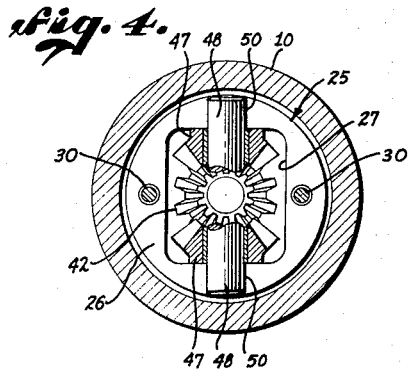
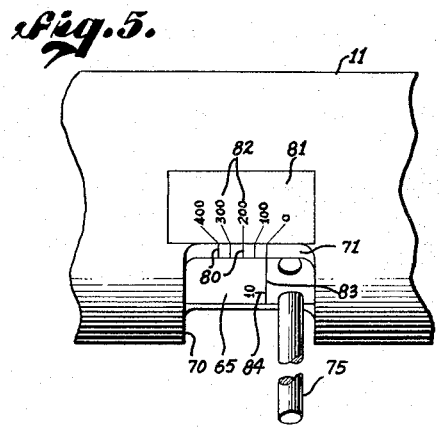
ALLEN J. BRAME,
INVENTOR.
BY
Attorney.

United States Patent Office 2,777,346
Patented Jan. 15, 1957

2,777,346

PREDETERMINED TORQUE RELEASE UNIT FOR WRENCHES AND THE LIKE

Allen J. Brame, Los Angeles, Calif., assignor, by mesne assignments, to Thomas P. Walker, Los Angeles, Calif., as trustee Application June 21, 1954, Serial No. 437,942

11 Claims. (Cl. 81—52.4)

This invention relates to portable power tools such as wrenches, nut runners, screwdrivers and the like, and is directed to a torque-limiting unit for such a tool. Such a torque-limiting unit is highly useful for installing screw-threaded fastening members with predetermined degrees of tightness and also has utility in various other operations where there is reason to limit the torque of a rotary tool to a predetermined magnitude.

The desired predetermined torque limitation is achieved by frictional slip means effective in the operative connection between a drive member and an output member of the tool. The invention is directed to the problem of providing such a friction arrangement in a relatively simple rugged unit that is of compact configuration and that operates with minimum wear. Broadly described, this problem is solved by a combination of planetary gearing and friction means in which the planetary gearing operatively connects the drive member of the tool with the output member and in which the friction means yieldingly opposes planetary rotation of the gearing.

The planetary gearing includes what may be termed a planetary cage that is immobilized by the friction means as long as the torque reaction of the cage is below a predetermined magnitude. When the predetermined torque reaction of the cage is reached, the cage rotates in opposition to the friction means and thereby limits the torque applied to the output member to a predetermined magnitude.

With reference to compactness, the preferred embodiment of the invention is characterized by the combination of a cylindrical tool housing and a planetary cage that is journalled in the housing coaxially thereof, the cage having a tubular extension that forms an annular space inside the housing. The cylindrical housing is only large enough in diameter to journal the planetary cage but room for the friction means that resists rotation of the cage is provided by the adjacent annular space around the tubular extension of the cage.

A pair of pinions co-axial with the housing and connected with the drive member and the output member respectively are inter-connected by at least one planetary pinion carried by the cage. A feature of the preferred embodiment of the invention is the journalling of both the drive member and the output member in the structure of the cage itself. Thus the housing rotatably supports the planetary cage and the planetary cage, in turn, rotatably supports both the drive member and the output member.

With reference to the effectiveness of the friction means and the problem of wear on the part of cooperating friction surfaces, a feature of the invention is the use of two cooperating sets of friction rings in the annular space adjacent the planetary cage. One set comprises rotary friction rings connected to the planetary cage for rotation therewith and the other set comprises alternate friction rings held stationary by the housing. It is merely necessary to subject the two sets of alternate rings to axial compression to create the desired frictional resistance. There is room for as many frictional rings in the annular space as needed for any desired total area of cooperating frictional surfaces.

Preferably the device includes means to vary the frictional resistance to rotation of the planetary cage thereby to vary the maximum torque delivered by the tool. For this purpose, a coiled spring that extends into the annular space to provide the required pressure against the friction rings is confined at one end by an axially adjustable means and suitable index means is provided to indicate the axial position of the adjustment means. In the preferred practice of the invention, the axial adjustable means is in the form of a bushing that is mounted by screw threads inside the cylindrical tool housing and the tool housing is provided with a suitable window for access to the adjustable bushing.

The various features and advantages of the invention may be understood from the following detailed description considered with the accompanying drawing.

In the drawing, which is to be regarded as merely illustrative:

Figure 1 shows the presently preferred embodiment of the invention partly in longitudinal section and partly in side elevation;

Figure 2 is a transverse section taken as indicated by the line 2—2 of Figure 1 showing how the bushing in the tool housing is rotatably adjusted;

Figure 3 is a transverse section taken as indicated by the line 3—3 of Figure 1 showing how the friction rings are mounted in the annular space inside the tool housing;

Figure 4 is a transverse section taken as indicated by the line 4—4 of Figure 1 showing the construction of the planetary gearing and Figure 5 is a fragmentary side elevation of the tool as seen from along the line 5—5 of Figure 2.

The selected embodiment of the invention illustrated by the drawing has a generally cylindrical housing comprising two housing sections 10 and 11. The housing section 11 is formed with a reduced end portion 13, the end portion 13 telescoping into the housing section 10 and being secured therein by mutually engaging screw threads 14 on the two housing sections. The housing section 10 is formed with a nipple portion 15 at its outer end to permit suitable output means (not shown) to be releasably connected with the housing. Such an output means may comprise, for example, a screwdriver member, a wrench member, or the like. The other end of the housing may be formed with internal screw threads 16 to permit the housing to be connected to a suitable power source (not shown).

Journalled inside the housing co-axially thereof are a rotary drive member 20 for actuation by the power source and a rotary output member 21. The rotary drive member 20 is in the form of a drive shaft having a tapered splined end 22 for engagement with the power source. The rotary output member 21 is a stub shaft having a diametrical slot 23 in its end for operative engagement with whatever tool or other means that is driven by the device.

Also journalled in the housing co-axially thereof is a planetary cage, generally designated 25, and preferably this cage is adapted to journal both the rotary drive shaft 20 and the rotary output shaft 21. In the construction shown, the planetary cage 25 comprises a cylindrical body 26 of hollow construction forming a gear chamber 27. The cylindrical body 26 is formed with a tubular extension 28 at one end to journal the drive shaft 20, the other end of the cylindrical body being formed with a hub portion 29 that journals the output shaft 21. To permit access to the gear chamber 27, the planetary cage 25 is split transversely into two sections which match end to end and which are releasably held together by a pair of longitudinal screws 30 indicated in Figure 4.

One end of the cylindrical body 26 of the planetary cage abuts a thrust bearing 34 which, in turn, abuts an inner annular shoulder 35 of the housing. The other end of the cylindrical body 26 of the planetary cage abuts a second thrust bearing 36. Preferably both of these thrust bearings are of the ball bearing type as indicated by the drawing.

A reduced end portion 38 of the drive shaft 20 extends into the gear chamber 27 and fixedly carries a beveled gear 39 backed against a washer 40. The washer 40 is of larger outside diameter than the inside diameter of the tubular extension 38 of the planetary cage to serve as an annular shoulder to prevent axial movement of the drive shaft 20 away from the gear chamber. In like manner, a reduced end portion 41 of the output shaft 21 extends into the gear chamber 27 and fixedly carries a second beveled gear 42 that backs against a washer 43. The washer 43 is larger than the inside diameter of the hub portion 29 of the planetary cage to prevent axial movement of the output shaft away from the gear chamber.

At least two planetary beveled gears are carried by the planetary cage 25 in mesh with the two beveled gears 39 and 42. In the present embodiment of the invention, two diametrically opposite planetary beveled gears 47 are mounted for this purpose on a diametrical pin 48. The pin 48 is positioned in two radial bores 50 in the planetary cage 25, these two bores being at the juncture of the two sections of the planetary cage 25. It is apparent that separation of the two sections of the cage permits access to all the beveled gears in the gear chamber 27.

It is apparent that if the planetary cage 25 is held against rotation, rotation on the part of the drive shaft 20 will be imparted to the output shaft 21 by means of the beveled gears in the gear cage 26 and that the planetary cage will be subject to a torque reaction which is a function of the torque delivered to the output shaft 21. If the load imposed on the output shaft 21 varies, the torque reaction on the planetary cage 25 will vary accordingly.

If some kind of frictional slip means is provided to immobilize the planetary cage 25, the planetary cage will remain stationary so long as the torque reaction to which the cage is subjected does not exceed the frictional resistance that tends to immobilize the cage. It is apparent, therefore, that a predetermined frictional resistance will limit the torque delivered to the output shaft 21 to a predetermined magnitude. If a rise in the load imposed on the output shaft 21 tends to cause the torque delivered to the output shaft to exceed this predetermined magnitude, the planetary cage will rotate in opposition to the friction means.

Any suitable arrangement for providing frictional resistance to rotation of the planetary cage 25 may be provided to carry out the purpose of the invention. Preferably, any such frictional arrangement that is employed will be adjustable with respect to the magnitude of the frictional resistance thereby to permit adjustment of the maximum torque that will be applied to the driving shaft 21.

In the present embodiment of the invention, the friction means include two sets of friction rings positioned face to face, with the rings of one set alternating with the rings of the other set. One set of rotary friction rings comprises individual friction rings 54 that are slidingly keyed to the tubular extension 28 of the planetary cage for rotation therewith. In the construction shown, each of the rotary friction rings 54 is formed with four equally spaced radially inward tongues 55 (Figure 3) which slidably engage four corresponding key ways 56 in the tubular extension 28 of the planetary cage.

A second set of non-rotary friction rings 57 which alternate with the rotary friction rings 54 are slidingly keyed to the cylinder housing section 10. For this purpose, each of the non-rotary friction rings 57 may be formed with four radially outwardly extending tongues 58 (Figure 3) which slidingly engage four corresponding longitudinal grooves 60 in the housing section 10. The longitudinal grooves 60 extend through the screw threads 14 of the housing section 10 to permit the non-rotary friction rings 57 to be inserted in the course of assembling the device.

A feature of the invention in respect to compactness and efficient utilization of the available space inside the cylindrical housing is that the means including the friction rings 54 and 57 for resisting rotation of the planetary cage 25 is mounted in the annular space 61 between the tubular extension 28 of the planetary cage and the surrounding inner wall of the cylindrical housing. This annular space is of sufficient length to accommodate a suitable coiled spring 62 that continually presses against the two sets of friction rings 54 and 57. It is to be noted that the coiled spring 62 not only presses the friction rings 54 and 57 into frictional contact with each other but also continually subjects the two thrust bearings 34 and 36 to axial pressure. Thus the spring keeps the thrust bearings tight and, in addition, automatically compensates for wear in the thrust bearings and among the friction rings 54 and 57. This feature of the invention provides a long service life for the device at peak efficiency.

A feature of the selected embodiment of the invention is that coiled spring 62 abuts an adjustment bushing 65 which may be manually rotated to vary the pressure exerted against the friction rings. The bushing 65 has a peripheral screw thread 66 which engages a corresponding internal screw thread of the casing section 11. The other end of the bushing is formed with a cylindrical skirt 67 of larger diameter which extends into the annular space 61 into abutment with the end of the coiled spring 62. In the construction shown, the bushing 65 is dimensioned to journal and stabilize the drive shaft 20, the drive shaft being also journalled in a suitable roller bearing 68.

It is apparent that rotation of the bushing 65 will vary the degree to which the spring 62 is compressed for the application of pressure against the friction rings 54 and 57. Any suitable provision may be made for rotary adjustment of the bushing. Preferably, some kind of index means is also provided to indicate various adjustments of the bushing.

In the present embodiment of the invention, the casing section 11 is provided with a window 70 for access to the bushing 65, this window having beveled edges 71 extending longitudinally of the cylindrical skirt 67 of the bushing. The bushing is formed with a series of circumferentially spaced recesses in the form of radial bores 72 (Figure 2) accessible through the window 70. This arrangement permits the bushing 65 to be rotated as desired by suitable means such as a pin or small rod 75. As may be seen in Figure 2, the pin 75 may be inserted through the window 70 into the exposed radial bores to rotate the bushing 65.

For the purpose of providing a suitable index to indicate various positions of adjustment of the bushing 65, suitable scale marks 80 are etched on one of the beveled edges 71 of the window and these scale marks are continued on an adjacent flat surface 81 of the housing section 11 as shown in Figure 5. Suitable numerals 82 on the flat surface 81 designate torque values for the scale marks 80, the values in this embodiment of the invention being 0, 100, 200, 300, and 400.

A circumferential index mark 83 on the adjustment bushing 65 is movable along the series of scale marks 80 in accord with rotary adjustment of the bushing. Preferably the periphery of the bushing 65 is also provided with a series of circumferentially spaced longitudinal index marks 84 adjacent the circumferential mark 83. In this instance, the index marks 84 divide the circumference of the adjustment bushing into ten equal parts and the pitch of the screw threads 66 is such that one complete rotation of the bushing will shift the circumferential index mark 83 from one scale mark 80 to the next scale mark.

It is apparent that each of the series of longitudinal index marks 84 will represent one-tenth of gradations represented by the scale marks 80 in terms of the maximum torque that will be delivered to the output shaft 21. The longitudinal index marks 84 may be provided with numerals accordingly. Figures 1 and 5 show a longitudinal index mark 84 with the numeral 10 adjacent thereto. The circumferential scale provided by the circumferentially spaced longitudinal marks 84 is read with reference to the bevel edge 71 that carries the scale marks 80. Thus in the adjustment of the bushing 65 shown in Figures 1 and 5 the longitudinal index mark 84 having the lowest value, i. e., zero value (not shown) is at the bevel edge 71 and the circumferential index mark 83 registers with the zero value scale mark 80. The adjustment therefore is for zero torque.

Clockwise rotation of the bushing 65 as viewed in section in Figure 2 will progressively compress the spring 62 to increase the pressure on the friction rings 54 and 57 and the resulting torque to which the output shaft 21 is limited may be ascertained by the described index means. So long as the torque carried by the output shaft 21 does not exceed this value, the planetary cage 25 will remain stationary to cause the output shaft 21 to rotate in synchronism with the drive shaft 20. Whenever the load imposed on the output shaft 21 tends to cause the torque of the output shaft to exceed the value shown by the index, the planetary cage 25 will rotate in opposition to the friction means and a portion of the delivered power will be absorbed and dissipated by the friction means with the output shaft 21 rotating at a slower rate than the drive shaft 20.

My description in specific detail of a selected embodiment of the invention, by way of example and to illustrate the principles involved, will suggest various changes, substitutions and other departures from my disclosure that properly lie within the spirit and scope of the appended claims.

I claim:

1. In a predetermined torque release unit for wrenches and the like, said unit having a rotary drive member and a rotary output member, the combination therewith of transmission means operatively connecting said drive member with said output member to actuate the output member with a predetermined maximum torque, said transmission means comprising: a first gear connected with said drive member; a second co-axial gear connected with said output member; a planetary cage co-axial with said two gears; at least one planetary gear rotatably mounted on said cage and meshed with both said first and second gears; a first plurality of axially movable friction rings keyed to said cage; a second plurality of axially movable friction rings anchored against rotation in face-to-face relation with said first plurality of rings; and means to place said two pluralities of friction rings under axial pressure to cause the second plurality of anchored rings to resist rotation of the first plurality of rings, thereby to immobilize said cage when the torque applied to said output member is below a predetermined magnitude.

2. A predetermined torque release unit for wrenches and the like, said unit having in combination: an elongated housing; a planetary cage rotatably mounted inside said housing, said cage having a tubular extension cooperating with the housing to form an annular space therein; a rotary drive member at one end of said cage positioned co-axially thereof; a rotary output member at the other end of the cage positioned co-axially thereof; a drive gear co-axially of said cage connected with said drive member; an output gear co-axially of said cage connected with said output member; at least one planetary gear rotatably mountel on said cage interiorly thereof in mesh with both said drive gear and said output gear; a first friction means in said annular space mounted on said tubular extension for rotation therewith; a second friction means in said annular space anchored against rotation; and means to place said first and second means under axial compression to immobilize said cage when the torque applied to said output gear is below a predetermined magnitude and to permit rotation of the cage when said maximum is exceeded.

3. A device as set forth in claim 2 in which said axial compression means comprises a coiled spring in said annular space having one end pressing against one of said friction means; and which includes means abutting the other end of said spring, said abutting means being axially movable to vary the pressure exerted by the spring.

4. A device as set forth in claim 2 in which said first friction means is keyed to said tubular extension and said second friction means is keyed to said housing.

5. In a predetermined torque release unit for wrenches and the like, the combination of: a rotary drive member; a rotary output member in coaxial alignment with the drive member; a first gear and a second gear mounted on the adjacent ends respectively of said two members co-axially therewith; a planetary cage coaxial with said two gears; at least one planetary gear rotatably mounted on said cage and meshed with both said first and second gears; friction means surrounding one of said members to resist rotation of said cage; spring means extending longitudinally of said one member to place said friction means under pressure to create frictional resistance; and a bushing surrounding said one member in abutment against said spring means, said bushing being screwthreaded for longitudinal adjustment against said spring means to vary said pressure.

6. A device as set forth in claim 5 which includes a tool housing enclosing said rotary members, gears and bushing; and in which said housing has a window therein for access to said bushing.

7. A device as set forth in claim 6 in which the housing and bushing are provided with index means for guidance in the longitudinal adjustment of the bushing.

8. A device as set forth in claim 5 in which said cage has a tubular extension; and in which one of said drive and output members is journalled both in said tubular extension and in said bushing.

9. A device as set forth in claim 5 in which both of said drive and output members are journalled in said cage.

10. A device as set forth in claim 5 which includes a tool housing enclosing said rotary members, gears and bushing; and which includes index means to indicate the rotary adjustment of said bushing, said index means including a longitudinal scale of transverse marks fixed relative to said housing to measure relatively large differences in torque values and also including a circumferential scale of longitudinal marks on said bushing to indicate smaller differences in torque value.

11. A device as set forth in claim 10 in which the index means includes: a longitudinal scale of spaced transverse marks on said housing; a circumferential mark on said bushing for observation with reference to said longitudinal scale; and circumferentially spaced longitudinal marks on said bushing for observation with reference to a point fixed relative to said housing.

References Cited in the file of this patent

UNITED STATES PATENTS

| | | |
|---|---|---|
| 1,908,763 | Kelty | May 16, 1933 |
| 1,930,343 | Hargrave | Oct. 10, 1933 |
| 1,975,984 | Stoll | Oct. 9, 1934 |
| 2,069,882 | Hall | Feb. 9, 1937 |
| 2,139,221 | Bronander | Dec. 6, 1938 |
| 2,235,192 | Bailey | Mar. 18, 1941 |
| 2,366,859 | Koza | Jan. 9, 1945 |
| 2,708,836 | Stuart | May 24, 1955 |

FOREIGN PATENTS

| | | |
|---|---|---|
| 233,207 | Great Britain | May 7, 1925 |
| 884,780 | Germany | July 30, 1953 |